R. B. BENJAMIN.
RECEPTACLE.
APPLICATION FILED NOV. 6, 1915.
1,320,196.
Patented Oct. 28, 1919
3 SHEETS—SHEET 1.
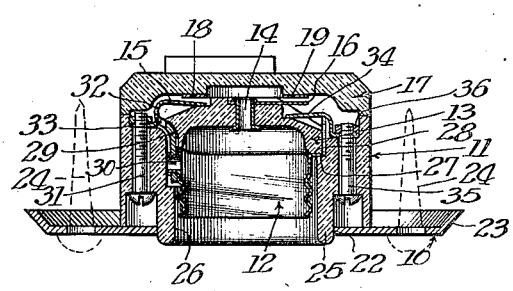
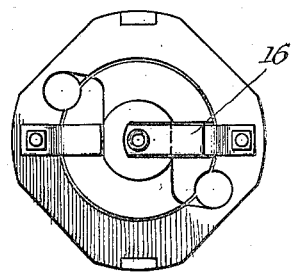
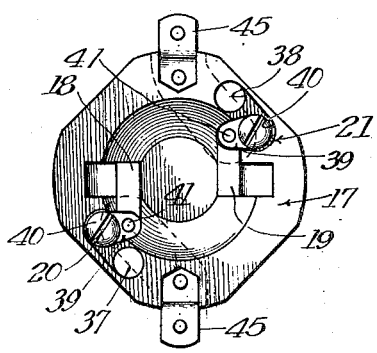
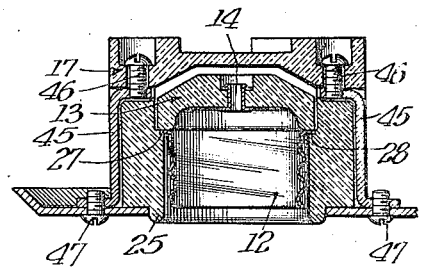
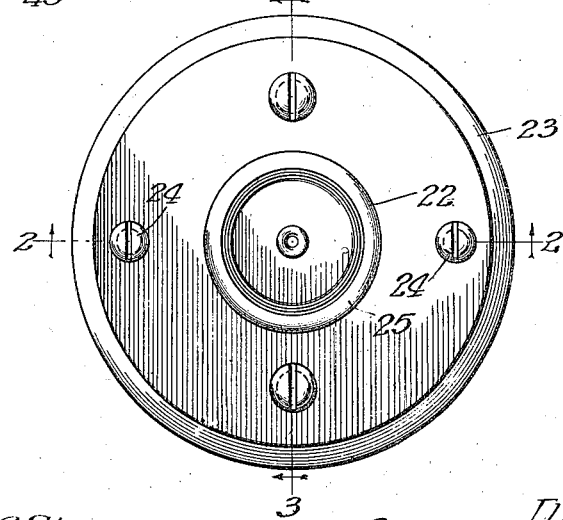

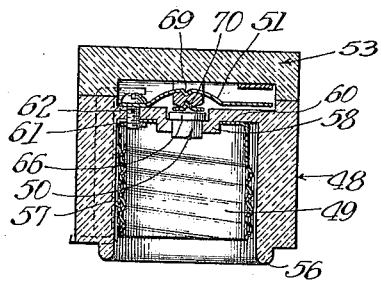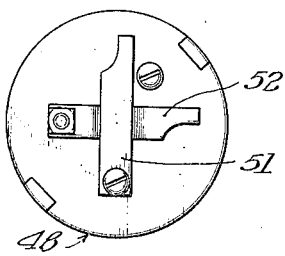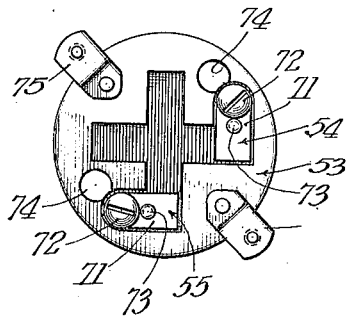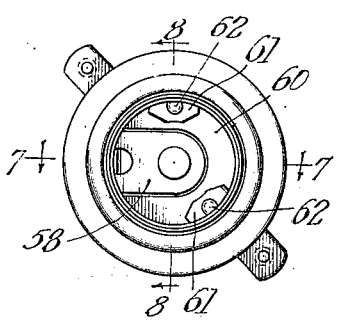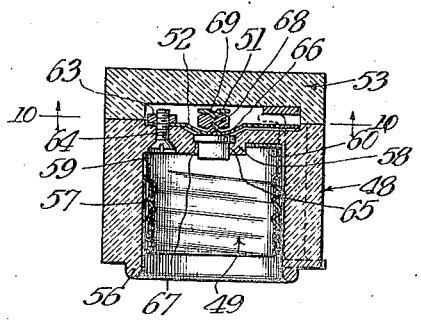

R. B. BENJAMIN.
RECEPTACLE.
APPLICATION FILED NOV. 6, 1915.
1,320,196.
Patented Oct. 28, 1919.
3 SHEETS—SHEET 3.
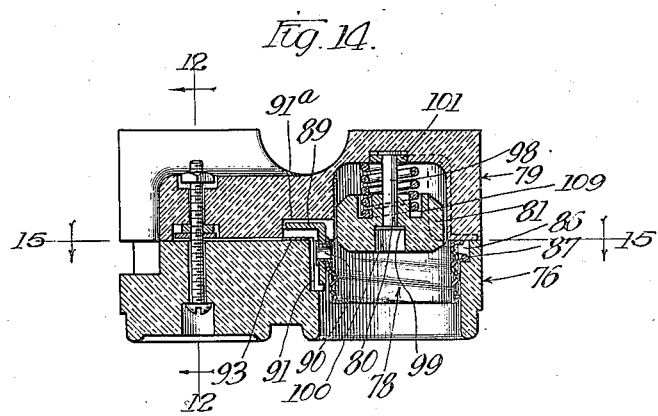
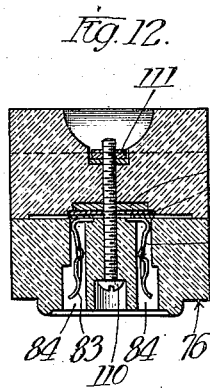
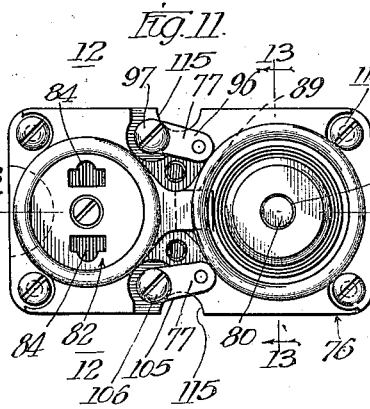
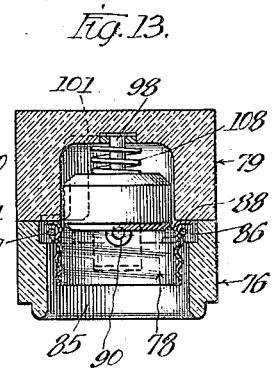
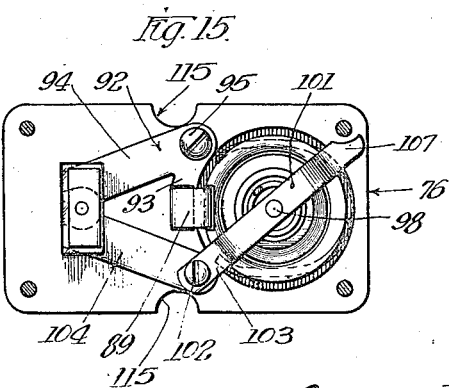
Witnesses:
Robert H. Weir
Inventor
Reuben B. Benjamin
Jones, Addington, Ames & Seibold Attys

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

RECEPTACLE.

1,320,196.   Specification of Letters Patent.   Patented Oct. 28, 1919.

Application filed November 6, 1915. Serial No. 59,991.

*To all whom it may concern:*

Be it known that I, REUBEN B. BENJAMIN, a citizen of the United States, residing at Chicago, in the county of Cook and State of Illinois, have invented new and useful Improvements in Receptacles, of which the following is a full, clear, concise, and exact description, reference being had to the accompanying drawing, forming a part of this specification.

My invention relates to receptacles, that is, to electrical receptacles provided with contact terminals for engagement with the corresponding contacts of an insertible device such as a lamp base or attachment plug.

One of the objects of my invention is to provide an improved device of this character in which the electrically charged parts are rendered difficult of access when the insertible device is removed from the receptacle.

Further objects will appear from the detailed description to follow taken in connection with the appended claims.

In the drawings, in which I have shown several embodiments of my invention—

Figure 1 is a plan view of a receptacle embodying my invention shown in connection with the cover plate;

Fig. 2 is a section on the line 2—2 of Fig. 1;

Fig. 3 is a section on the line 3—3 of Fig. 1;

Fig. 4 is a plan view of the inner insulating base and the parts supported thereby;

Fig. 5 is a rear view of the outer insulating base and the parts supported thereby;

Fig. 6 is a plan view of a modified form of receptacle;

Fig. 7 is a section on the line 7—7 of Fig. 6;

Fig. 8 is a section on the line 8—8 of Fig. 6;

Fig. 9 is a rear view of the outer insulating base and parts supported thereby;

Fig. 10 is a front view of the rear insulating base and the parts supported thereby;

Fig. 11 is a plan view of a still further modification of my invention showing it in connection with a duplex wall receptacle;

Fig. 12 is a section on the line 12—12 of Fig. 11;

Fig. 13 is a section on the line 13—13 of Fig. 11;

Fig. 14 is a section on the line 14—14 of Fig. 11; and

Fig. 15 is a rear view of the outer insulating base and the parts supported thereby.

Referring now to the drawings in detail and first to the modification of Figs. 1 to 5, the parts here shown comprise a cover plate 10 for an outlet box or the like, an outer insulating base 11 for supporting various parts of the receptacle, a shell contact 12 supported by the base 11, a movably mounted insulating plunger 13, a center contact 14 carried by the plunger 13, a spring contact 15 electrically connected with the shell contact 12 and operated by the plunger 13, a contact 16 electrically connected with the center contact 14, and a rear insulating base 17 secured in proper relative position with respect to the outer base 11, a contact 18 supported on the base 17 for engagement with the spring contact 15, a contact 19 supported on the base 17 for engagement with the contact 16, and binding terminals 20 and 21 electrically connected with the contacts 18 and 19, respectively.

The cover plate 10 is provided with an opening 22 through which a portion of the receptacle extends and with a flange 23 for engagement with a suitable support. The cover plate is secured in position by means of screws 24. The outer base 11 has an annular flange 25 extending through the opening 22 and a central recess 26 to receive the shell contact 12. A shoulder 27 is provided near the inner end of the recess 26 for engagement with a flange 28 on the shell contact 12. The shell contact 12 is held in position on the base 11 and electrically connected to the spring contact 15 by an L-shaped member 29 one arm of which is secured to the contact 12 by means of an eyelet 30, and the other arm of which has a screw threaded opening to receive a screw 31 for securing it on the base 11. The member 29 is provided with an opening 32 through which the spring contact 15 extends, the spring contact 15 being provided with a base portion 33 having an opening through which the screw 31 extends, whereby it is firmly held on the base 11.

The tension in the spring 15 is such as to normally hold the plunger 13 in its outermost position. To equalize the spring pressure on this plunger leaf spring 34 is provided on the side opposite the contact 15 which leaf spring also bears on the plunger and tends to hold it in its outermost position. This leaf spring 34 is held in position on the base 11 by means of a screw 35 and nut 36. The rear base 17 is provided with two openings 37 and 38 affording passages for the leading-in wires adjacent the binding terminals 20 and 21. These binding terminals each comprises a binding plate 39, binding screw 40 and a screw 41 holding the binding plate on the base 17. The receptacle is held in place on the cover plate 10 by means of a pair of clips 45 secured to the rear base 17 by means of screws 46 and to the cover plate by means of screws 47.

The use and operation of this receptacle is as follows: With the parts in the position shown in Fig. 2 the shell contact 12 and center contact 14 will both be dead or electrically disconnected and the spring contact and spring 34 will hold the plunger 13 in its outermost position. When, however, the plug or lamp base is screwed into the shell contact 12 the center contact of the lamp base or plug will engage the center contact 14 and will force the plunger 13 inwardly against the action of the spring contact 15 and spring 34 until the contact 15 engages the contact 18, and until the contact 16 engages the contact 19. This will establish a circuit through the receptacle and inserted device, through the binding terminal 21, contact 19, contact 16, center contact 14, lamp circuit, shell contact 12, member 29, spring contact 15, contact 18 and binding terminal 20.

In the modification of Figs. 6 to 10 I have shown my invention in connection with a receptacle comprising an outer insulating base 48, shell and center contacts 49 and 50 supported by said base, contact springs 51 and 52 also supported by said base and electrically connected with said shell and center contacts, respectively, an inner insulating base 53 supported in proper relative position with respect to the outer base, and combined binding and contacting terminals 54 and 55 supported by the insulating base 53 for electrical connection with the contact springs 51 and 52, respectively. The outer base 48 has an annular flange 56 which extends through an opening in the cover plate (not shown) and is provided with a central recess 57 to receive the shell contact 49, and has a boss 58 at the bottom of the recess 57 to insure insulation between the shell and center contacts. The shell contact 49 is cut away at 59 to prevent short circuiting and is provided with a U-shaped flange 60 for engagement with nuts 61 into which screws 62 are threaded for holding the shell contact 49 on the base 48. One of these screws 62 is also utilized to secure the contact spring 51 in place and to electrically connect it with the shell contact 49. The contact spring 52 is secured on the base 48 by means of a nut 63 and screw 64. The center contact 50 is mounted in an opening 65 in the base 48 and is provided with a shoulder 66 for engagement with a corresponding shoulder 67 on the base.

For insulating the contact springs 51 and 52 from each other, and for transmitting pressure from the spring 52 to the spring 51, a spacing member 68 is provided having depressions on its opposite sides for engagement with corresponding projections 69 and 70 on the contact springs 51 and 52. The binding and contact terminals 54 and 55 each comprises a binding plate 71, a binding screw 72 and a screw 73 for securing the binding plate in position on the inner base 53.

The parts are held in position on the cover plate by means of clips 75 similar to the clips 45 of the form shown in Figs. 1 to 5.

The use and operation of this modification is as follows: When the parts are in the position shown in Fig. 8 both of the contacts are dead as the tension in the springs 51 and 52 is such as to firmly hold them away from engagement with the binding plates 71. When, however, the lamp base or attachment plug is screwed into the shell contact 49 the center contact of the inserted device will engage the center contact 50 and force it inwardly causing the spring contacts 51 and 52 to be forced inwardly to engage the binding plates 71, this establishing a circuit from the binding terminal 55 through the spring contact 52, center contact 50, lamp circuit, shell contact 49, screw 62, spring contact 51 and binding terminal 54.

In the modification of Figs. 11 to 15 I have shown my invention in connection with a duplex wall receptacle having one set of terminals for engagement with an insertible device having a threaded shell contact and a center contact, and another set of contact terminals for engagement with a detachable insertible device such as the cap of a separable attachment plug. This wall base comprises an outer insulating base 76 for supporting the contact terminals and other parts, binding and contact terminals 77 supported by the base 76, a shell contact 78 also supported by the base 76, an inner insulating base 79, a center contact 80, an insulating guard or plunger 81 slidably mounted on the center contact, and a set of contacts and connections 82 for connecting with the cap of a separable attachment plug. The latter connections comprise a pair of spring contacts 83, located in spaced recesses 84 in the outer base 76. This outer base 76 is also provided with a circular recess 85 to receive 13 the shell contact 78 and this recess 85 is enlarged at 86 to accommodate a spring 87 which embraces the shell contact 78 and bears on the flange 88 of the shell contact and the shoulder formed by the enlargement 86 of the recess 85. An L-shaped contact member 89 is secured to the shell contact by means of an eyelet 90. The outer and inner bases 76 and 79 are recessed at 91 and 91ª respectively, to accommodate the L-shaped contact 89 and to guide the contact in its movement. A contact plate 92 is provided for the contact 89, this contact having an extension 93 located in the path of movement of the contact 89, and an extension 94 for connection with one of the spring contacts 83. The plate 92 is held on the base 76 by means of a screw 95 which also holds the binding plate 96 in place and electrically connects the two plates.

The binding plate 96 is provided with the usual binding screw 97. The center contact 80 comprises a post or rod 98 on which the plunger 81 slides, and a head 99 located in the recess 100 in the plunger whereby the center contact is rendered difficult of access when the plunger is in its outermost position. The center contact is mounted on a yoke 101 secured on the base 76 by means of a screw 102 which extends through a lateral extension 103 on the yoke. This screw 102 also serves to hold the binding plate 105 in position and to electrically connect the yoke and binding plate. The binding plate 105 is provided with the usual binding screw 106. A conductor plate 104 leads from the screw 102 to one of the spring contacts 83.

As a further means for holding the yoke in place it is provided with a lateral extension 107 which is held between the inner and outer bases. The plunger 81 is normally held in its outermost position by means of a coil spring 108 one end of which is seated in an annular recess 109 in the plunger and the other end of which bears against the base 79 and yoke 101. For holding the inner and outer bases together a screw 110 is threaded into a nut 111. This screw also assists in holding the spring contacts 83 in position by engagement with a nut 112 to clamp the contacts against the outer base 76. Suitable insulation 113 is provided between the nut 112 and the contacts 83.

As a further means for holding the inner and outer bases together screws 114 are provided. Both the inner and outer bases are recesses as shown at 115 to provide a passage for the leading-in wires to the binding plates.

The use and operation of this modification is as follows: Assuming that the parts are in the position shown in Fig. 14 the center contact 80 would be difficult of access as the spring 108 holds the plunger 81 in its outermost position, and the shell contact 78 will be dead as the spring 87 holds the shell contact in its innermost position in which the contact 89 will not engage the extension 93 of the contact plate 92. When, however, the lamp or plug is screwed into the threaded shell socket the inner end of the plug or lamp will engage the plunger 81 and force it inwardly until the center contact of the lamp engages the center contact of the receptacle. After the center contacts are in engagement further rotation of the lamp base will cause the threaded shell 78 to move outwardly against the pressure of the spring 87 until the contact 89 engages the extension 93 of the conducting plate 92. This will establish a circuit from the binding terminal 77, through the screw 102, yoke 101, center contact 80, lamp circuit, shell contact 78, contact 89, contact plate 92, screw 95 to the other binding terminal 77.

When the cap of an attachment plug is inserted so that its contacts engage the contacts 83 a circuit is established from one of the binding terminals 77 through the screw 102, conductor plate 104, spring contact 83 through the circuit of a translating device to the other contact 83 through the extension 94 of the conductor plate 92 through the screw 95 to the other binding terminal 77.

Having thus described my invention what I claim as new and desire to secure by Letters Patent is:—

1. A receptacle having a shell contact movably mounted to be electrically connected and disconnected with respect to the feed circuit, and a center contact, said contacts being constructed to engage the shell and center contacts of an insertible device, said receptacle being constructed so that the insertion of said insertible device will move the shell contact into electrical connection.

2. A receptacle having a shell contact mounted for axial movement to be electrically connected and disconnected with respect to the feed circuit, and a center contact, said contacts being constructed to engage the center and shell contacts of an insertible device, said receptacle being constructed so that the insertion of said insertible device will move the shell contact into electrical connection.

3. An electrical receptacle having a shell contact mounted for axial movement, means whereby when said shell contact is in its inner position it is disconnected with respect to the feed circuit, and when in its outer position it is connected with respect to the feed circuit, and a center contact, said contacts being constructed to engage the center and shell contacts of an insertible device, said receptacle being constructed so that the insertion of said insertible device will move the shell contact outward into electrical connection with respect to the feed circuit.

4. An electrical receptacle having a center contact and a movable shell contact, and means whereby movement of said shell contact caused by the insertion of a translating device will cause it to be electrically connected with respect to the feed circuit.

5. An electrical receptacle comprising a shell contact and a center contact, said shell contact being mounted for axial movement, whereby when an insertible device is screwed into said receptacle after engagement with said center contact said shell contact will be drawn outwardly, and means whereby when said shell contact is drawn outwardly it will be electrically connected with respect to the feed circuit.

6. An electrical receptacle comprising a two-part insulating base, shell and center contacts supported by said base, said shell contact being mounted for axial movement, a fixed contact electrically connected with respect to the feed circuit and located between said base parts, and a contact carried by said shell contact movable into and out of engagement with respect to said fixed contact.

7. An electrical receptacle comprising a center contact and a movably-mounted shell contact, means whereby movement of said shell contact will cause it to be electrically connected and disconnected with respect to the feed circuit, and spring means for normally holding said shell contact in disconnected position.

8. An electrical receptacle comprising a two-part insulating base, shell and center contacts supported thereby, said shell contacts being movably mounted, means whereby movement of said shell contact will cause it to be electrically connected and disconnected with respect to the feed circuit, and spring means located between said base parts for normally holding said shell contact in disconnected position.

In witness whereof, I have hereunto subscribed my name in the presence of two witnesses.

REUBEN B. BENJAMIN.

Witnesses:
P. D. PHILLIPS,
M. J. CLEARY.